United States Patent [19]
Kitaoka

[11] Patent Number: 5,956,227
[45] Date of Patent: *Sep. 21, 1999

[54] INTERNAL DEVICES AND ELECTRONIC DEVICES

[75] Inventor: Yasuhide Kitaoka, Kodaira, Japan

[73] Assignee: Teac Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/889,382

[22] Filed: Jul. 8, 1997

[30] Foreign Application Priority Data

Jul. 12, 1996 [JP] Japan ................................. 8-183847

[51] Int. Cl.$^6$ ........................................................ H05K 7/20
[52] U.S. Cl. ...................... 361/695; 361/683; 361/687; 361/697; 361/727; 454/184; 312/298; 307/141; 165/104.34
[58] Field of Search .................................. 361/679–687, 361/690–698, 700–722, 727; 364/200; 257/700–718; 165/80.2, 80.3, 80.4, 185, 104.34; 174/16.3, 52.1, 38, 65 R, 156, 152 G; 248/74.1, 56; 312/138.1, 298, 350; 439/709; 340/635; 454/184; 307/125, 141

[56] References Cited

U.S. PATENT DOCUMENTS 4,754,397  6/1988  Varaiya et al. .......................... 364/200
5,440,450  8/1995  Lau et al. ................................ 361/695

FOREIGN PATENT DOCUMENTS 4195793  7/1992  Japan ............................. G11B 33/14
5-89653  4/1993  Japan ............................. G11B 33/14

*Primary Examiner*—Leo P. Picard
*Assistant Examiner*—Michael Datskovsky
*Attorney, Agent, or Firm*—Ladas & Parry

[57] ABSTRACT

An internal device contained in an electronic device includes a housing, a part of which has a step portion; and a fan provided in a vicinity of the step portion, so that a space is provided as a pathway for an air flow generated by the fan, a part of the space having a boundary defined by the step portion of the housing when the internal device is positioned in the electronic device.

15 Claims, 10 Drawing Sheets

INTERNAL DEVICES AND ELECTRONIC DEVICES

BACKGROUND OF THE INVENTION

1. Field of the Invention

The present invention generally relates to internal devices and an electronic device containing the internal devices, and more particularly, to an electronic device in which a plurality of internal devices positioned in a respective slot of the electronic device may be located close to each other without thermally affecting each other.

2. Description of the Related Art

Recently, various kinds of electronic devices have been used world-wide. In many of such electronic devices, various internal devices are included. For example, internal devices such as a CD-ROM drive, a hard disk drive, and a floppy disk drive are included in a main body of a personal computer.

In many personal computers, it is desired that a music CD, WAVE file or MIDI sound source be reproduced with excellent sound quality.

In a conventional personal computer, audio signals output from the main body are amplified by an amplifier provided with a speaker(s). However, since the capacity of the amplifier contained in the speaker is small, there is a limitation on the sound quality and it is difficult to reproduce audio signals recorded in a CD-ROM with satisfactory sound.

Thus, attempts have been made to improve a sound quality by supplying audio signals to a speaker. The signals are amplified by an amplifier having a larger capacity. The amplifier is placed in one of a plurality of slots, for example, a 5-inch bay located in the main body of a personal computer. Thus, no amplifier is contained in a speaker.

However, when such an amplifier is placed in the slot of the main body as an internal device, it is necessary to provide a fan for generating an air flow and lowering the temperature of the device since the amount of heat generated from a power IC contained in the amplifier is large.

Also, in the main tower body of a personal computer, a motherboard on which LSI (large-scale integrated circuits) are mounted, a CD-ROM drive, a hard disk drive, etc., are present. Since the LSI and various ICs have a relatively weak resistance to heat, evacuation fans for evacuating air in the main body and air-intake fans for supplying outside air to the inside of the main body are provided. These fans are positioned so as to generate an appropriate air flow in the main body to lower the temperature.

However, since only the upper slots are usually occupied by the above-mentioned devices the lower slots may be used for other devices purchased at a later time by a user for expansion purposes. The space available between adjacent devices, for instance, the CD-ROM drive and the amplifier, positioned in the upper slots is small.

Accordingly, although the evacuation fans and the air-intake fans are provided in the main body, it is difficult to provide for a sufficient air flow between the CD-ROM drive and the amplifier, and hence there is a danger that both of the internal devices be overheated. Thus, there is a possibility that an abnormal operation will be caused by the computer.

SUMMARY OF THE INVENTION

Accordingly, it is a general object of this invention to provide an internal device in which the above-mentioned problems are eliminated.

Another object of this invention is to provide an electronic device including the internal device(s) in which the above-mentioned problems are eliminated.

Yet another object of the present invention is to provide an internal device in which the temperature thereof may be efficiently lowered. This permits placement of the internal device next to another internal device which would otherwise be easily affected by the heat.

Still another object of the present invention is to provide an electronic device in which the temperature of the internal device contained therein may be lowered efficiently. Hence, a decrease in performance or an abnormal operation of the electronic device due to a temperature increase may be avoided.

The objects described above are achieved by an internal device contained in an electronic device comprising: a housing, a part of the housing having a step portion; and a fan provided in a vicinity of the step portion, wherein a space is provided as a pathway for an air flow generated by the fan, a part of the space having a boundary defined by the step portion of the housing when the internal device is positioned in the electronic device.

The objects described above are also achieved by the internal device wherein the housing is substantially a rectangular solid having the step portion.

The objects described above are also achieved by the internal device wherein a slot provided with the electronic device and in which the internal device is placed has a substantially rectangular shape corresponding to the shape of the internal device.

The objects described above are also achieved by the internal device wherein a part of the space has a boundary defined by a surface of another internal device placed next to the internal device.

The objects described above are also achieved by the internal device wherein the fan is positioned on a surface of the housing which defines the step portion.

According to the above internal device, since the space is formed by the step portion of the housing when the internal device is placed in the electronic device and the space functions as a pathway for an air flow generated by the fan, it becomes possible to lower the temperature of the internal device efficiently compared with an conventional internal device by which no space can be formed. Thus, an internal device from which a large amount of heat is generated may be placed next to an internal device which has a tendency to be affected by a heat. Accordingly, it is possible to prevent a decrease in performance or an abnormal operation of the electronic device due to a temperature increase.

The objects described above are achieved by an electronic device including at least one internal device, the internal device comprises: a housing, a part of the housing having a step portion; and a fan provided in a vicinity of the step portion, wherein a space is provided as a pathway for an air flow generated by the fan, a part of the space having a boundary defined by the step portion of the housing when the internal device is positioned in the electronic device.

According to the above electronic device, since the space is formed by the step portion of the housing when the internal device is placed in the electronic device and the space functions as a pathway for an air flow generated by the fan, it becomes possible to lower the temperature of the internal device efficiently. Accordingly, it is possible to prevent a decrease in performance or an abnormal operation of the electronic device due to a temperature increase.

The objects described above are achieved by an electronic device including at least a first slot and a second slot located next to the first slot, wherein a first internal device comprises: a housing, a part of the housing having a step portion; and a fan provided in a vicinity of the step portion, the first internal device located in the first slot, and a second internal device located in the second slot, wherein a space is provided between the first internal device and the second internal device as a pathway for an air flow generated by the fan, a part of the space having a boundary defined by the step portion of the housing of the first internal device and a surface of the second internal device facing the first internal device.

According to the above electronic device, since the space, a part of whose boundaries is defined by the step portion of the housing of the first internal device and a surface of the second internal device facing the first internal device, is present between the first internal device and the second internal device as a pathway for an air flow generated by the fan, it becomes possible to lower the temperature of both of the first internal device and the second internal device at the same time. Accordingly, the cooling efficiency of the devices is improved, and hence a decrease in performance or an abnormal operation of the electronic device due to a temperature increase may be avoided.

Other objects and further features of the present invention will be apparent from the following detailed description when read in conjunction with the accompanied drawings.

DESCRIPTION OF THE PREFERRED EMBODIMENTS

In the following, a principle and embodiments of the present invention will be described with reference to the accompanying drawings.

Figure 1:
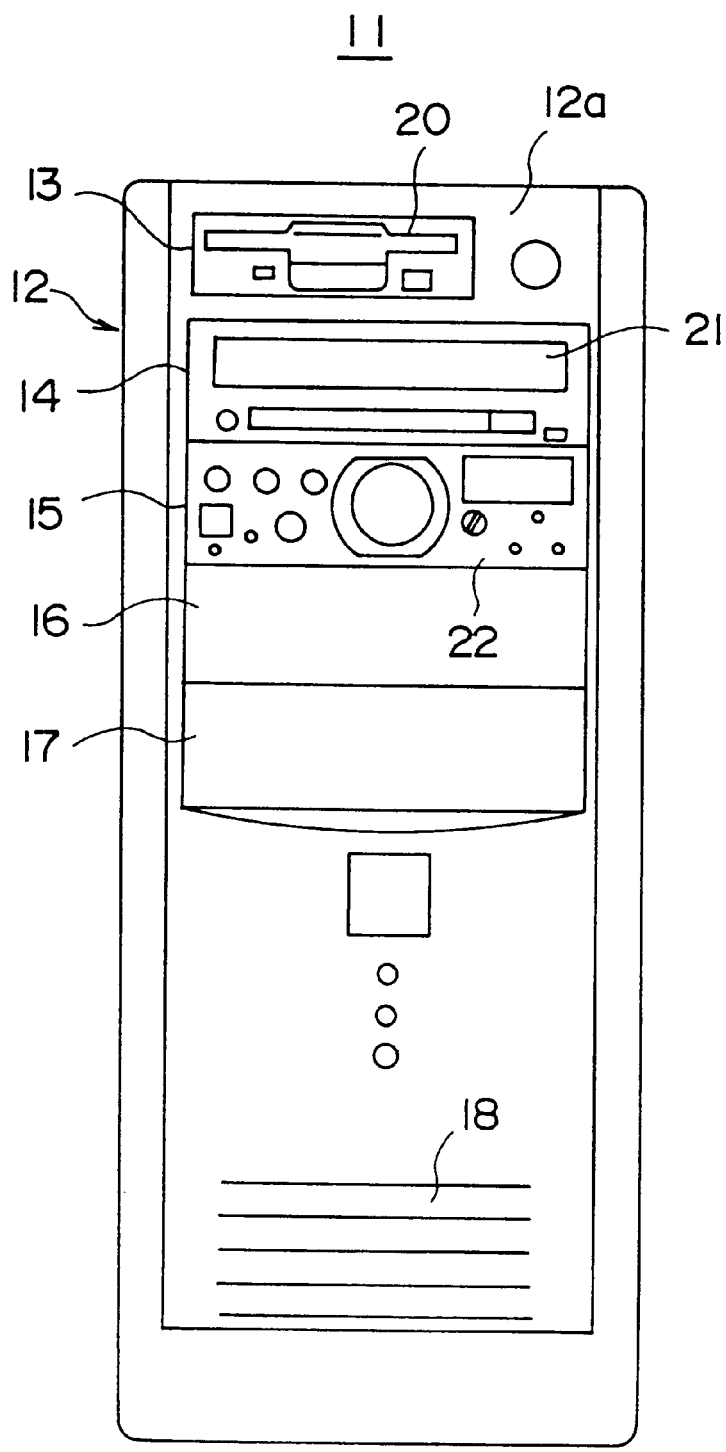
FIG. 1 is a diagram showing a front view of a main body of a personal computer as an electronic device according to an embodiment of the present invention.
Figure 2:
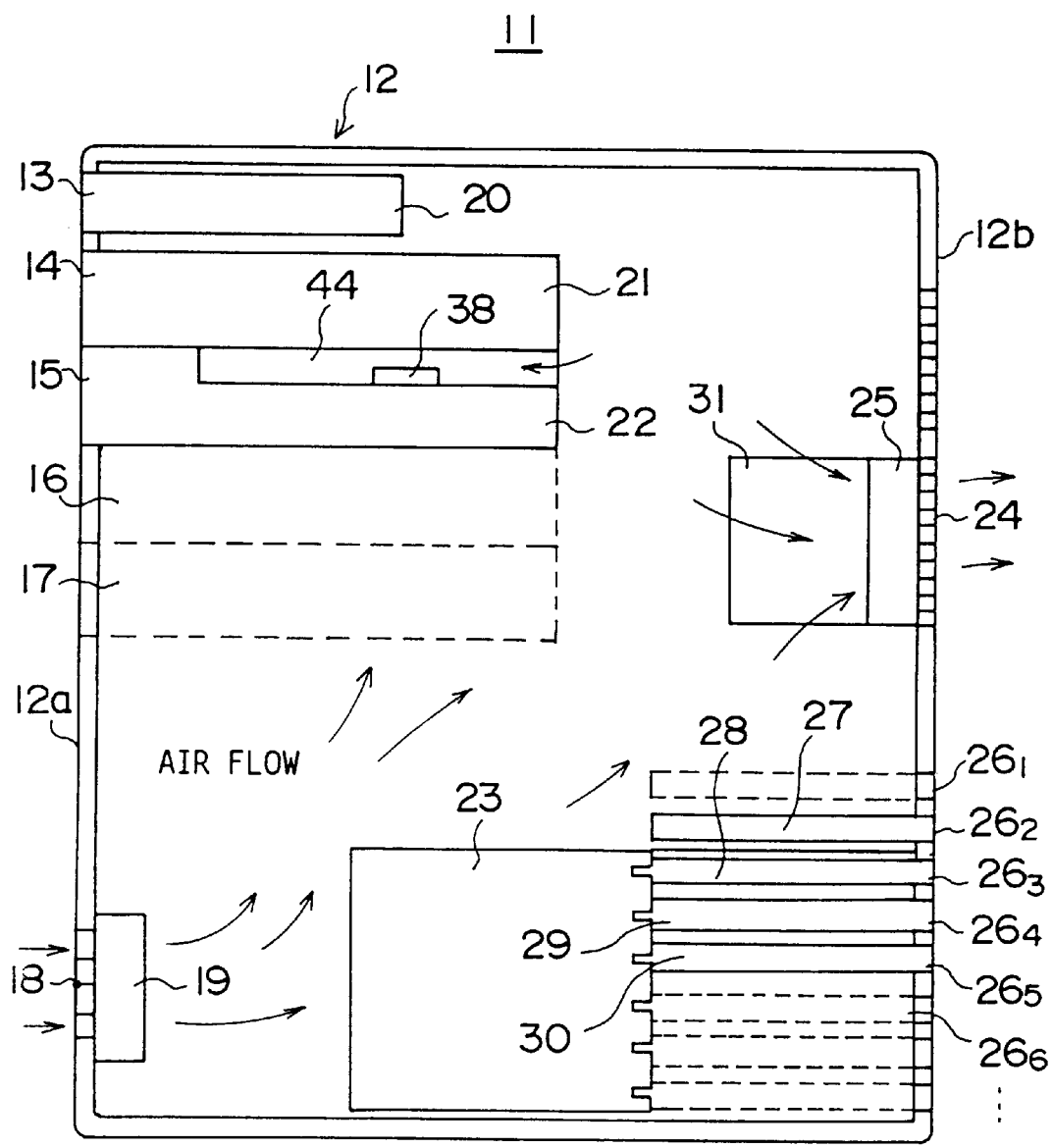
FIG. 2 is a diagram showing a cross-section in a vertical direction of the main body of the personal computer.

FIG. 1 is a diagram showing a front view of a main body 11 of a component of a personal computer as an electronic device according to an embodiment of the present invention. FIG. 2 is a diagram showing a cross-section in a vertical direction of the main body 11 and FIG. 3 is a diagram showing a back or rear view of the main body 11 of the personal computer.

Figure 3:
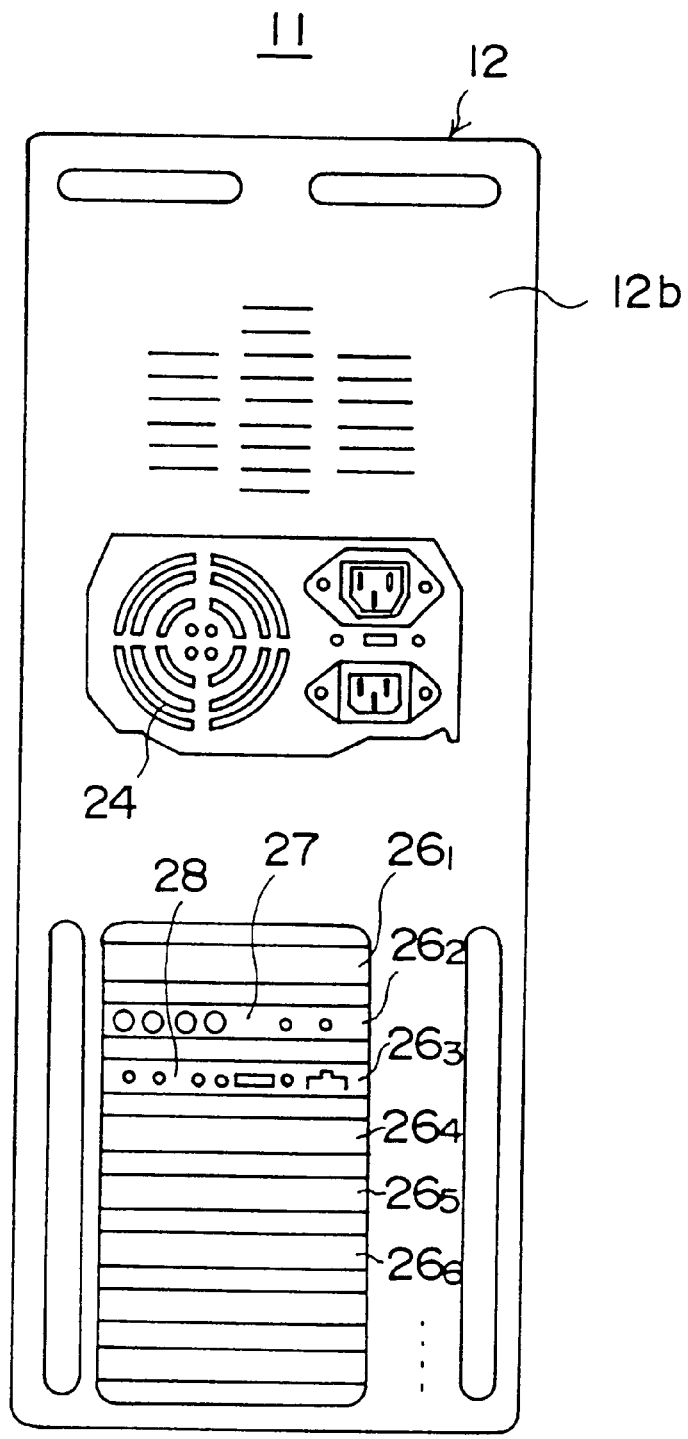
FIG. 3 is a diagram showing a rear view of the main body of the personal computer.

The main body 11 of the personal computer device shown in FIGS. 1 through 3 is a so-called main tower and is used in a standing state. As shown in FIGS. 1 and 2, five slots 13 through 17 are provided at a front surface 12a of a housing 12 of the main body 11. Also, air-supply slits 18 are provided at a bottom of the front surface 12a of the housing 12, and an air-intake fan 19 is fixed to the air-supply slits 18 so that air may be taken inside of the main body 11 as shown in FIG. 2.

A floppy disk drive device 20 is provided in an uppermost slot 13 and a CD-ROM drive device 21 is provided in a second slot 14. An amplifier 22 is positioned in a third slot 15. No device is provided in a fourth and a fifth slots or expansion bays 16 and 17 as they are used for expansion purposes.

As shown in FIG. 2, a motherboard 23 is fixed to a bottom surface of the housing 12. Evacuation slits 24 are provided at a center of a back surface 12b of the housing 12, and an evacuation fan 25 is fixed to the evacuation slits 24. Also, a power source unit 31 is provided in the vicinity of the evacuation fan 25. The power source unit 31 contains transistors which generate a relatively large amount of heat.

Also, a plurality of slots $26_1$ through $26_n$ for mounting respective elements or cards such as pcmcia cards are provided at the back surface 12b of the housing 12. In this embodiment, nothing is provided in an uppermost slot $26_1$ and a connector card 27 is provided with a second slot $26_2$. Likewise, a sound card 28 is provided with a third slot $26_3$ and other cards 29 and 30 such as a VGA card are provided with fourth and fifth slots $26_4$ and $26_5$. Slots $26_6$ to $26_n$ are unoccupied and may be used for expansion purposes. Note that the sound card 28 and the other cards 29 and 30, respectively, are connected to the motherboard 23.

In the above-mentioned housing 12, the air taken inside the housing 12 by the air-intake fan 19 is used to decrease the temperature of the internal devices and the elements or cards positioned in the respective slots as well as the temperature of the power source unit 31, and is finally evacuated by the evacuation fan 25 to the exterior of the main body 11. Thus, a flow of air is generated in the housing 12 and the heat generated by the devices and the boards is dissipated with the flow of the air.

Figure 4:
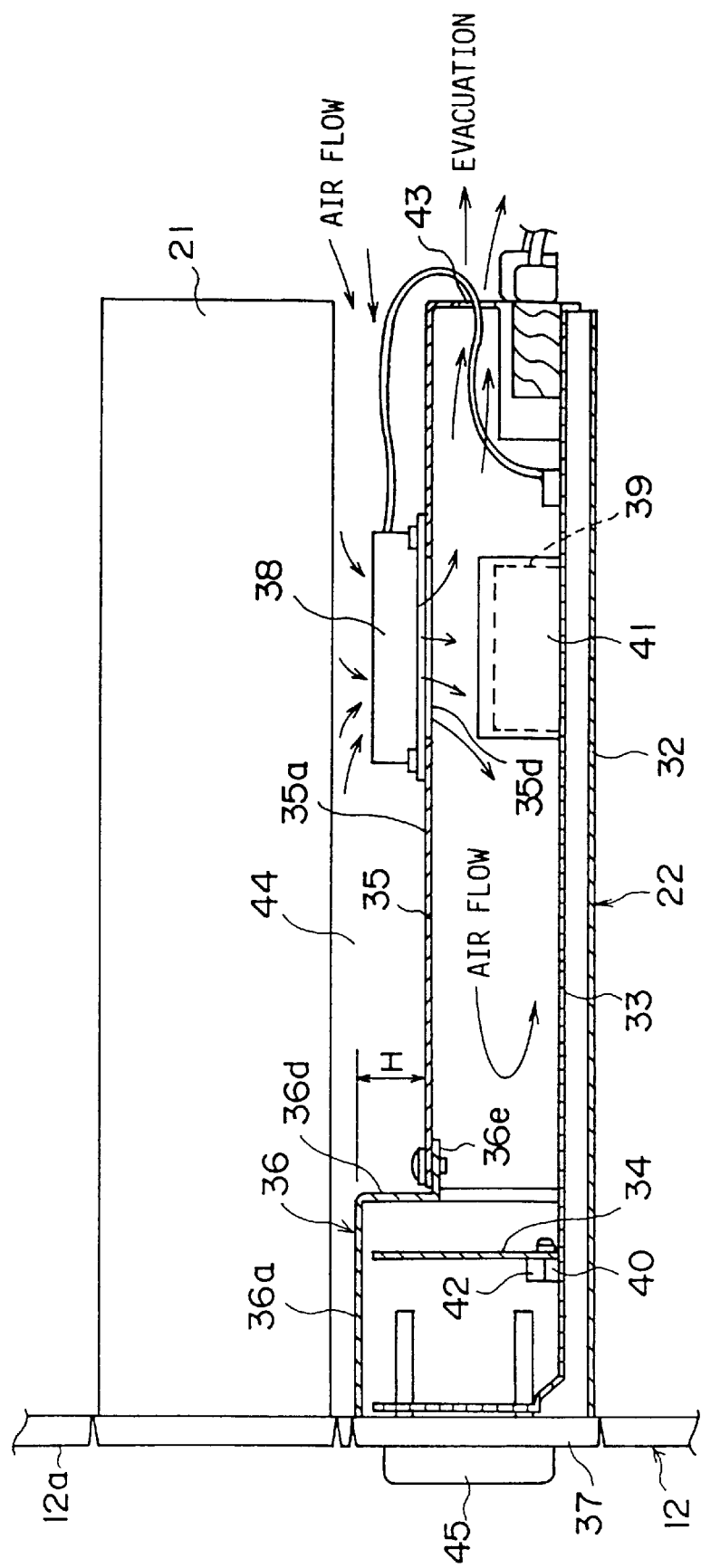
FIG. 4 is a diagram showing a cross-sectional view of a fixing state of a CD-ROM drive device and an amplifier in a magnified scale.

FIG. 4 is a diagram showing a cross-sectional view of an installation of the CD-ROM drive device 21 and the amplifier 22 in a magnified scale.

As mentioned above, since the plurality of slots 13 to 17 are provided close to each other, the space between the lower surface of the CD-ROM drive device 21 and the upper surface of the amplifier 22 is very small. Also, a board having electronic parts thereon is provided on the lower surface of the CD-ROM drive device 21. These electronic parts also generate a large amount of heat. For this reason, heat generated between the CD-ROM drive device 21 and the amplifier 22 is difficult to dissipate even by a flow of air generated by the above air-intake fan 19 and the evacuation fan 25. Thus, the temperature therebetween tends to increase during operation of the computer.

Figure 5:
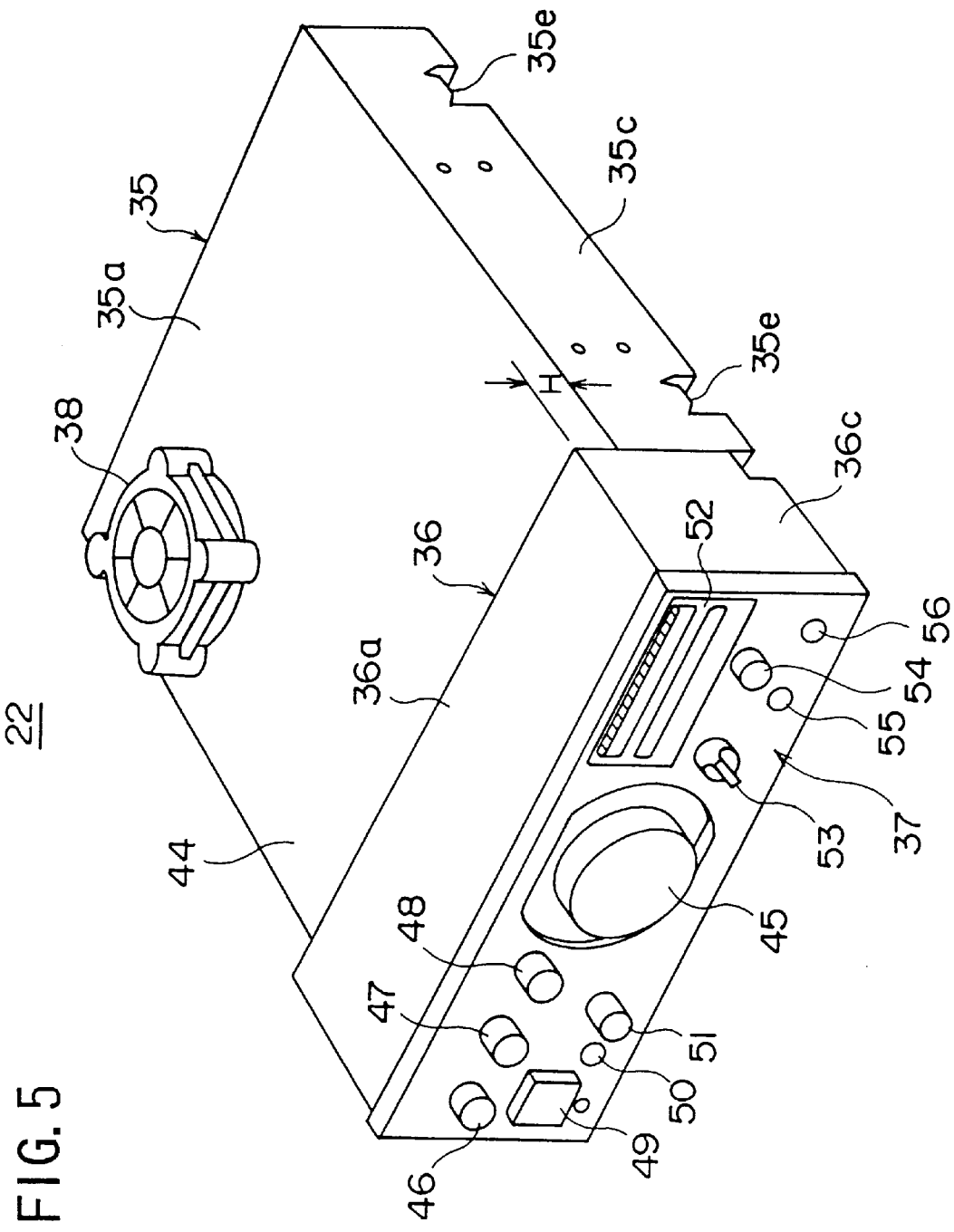
FIG. 5 is a diagram showing a perspective view of the amplifier.
Figure 6:
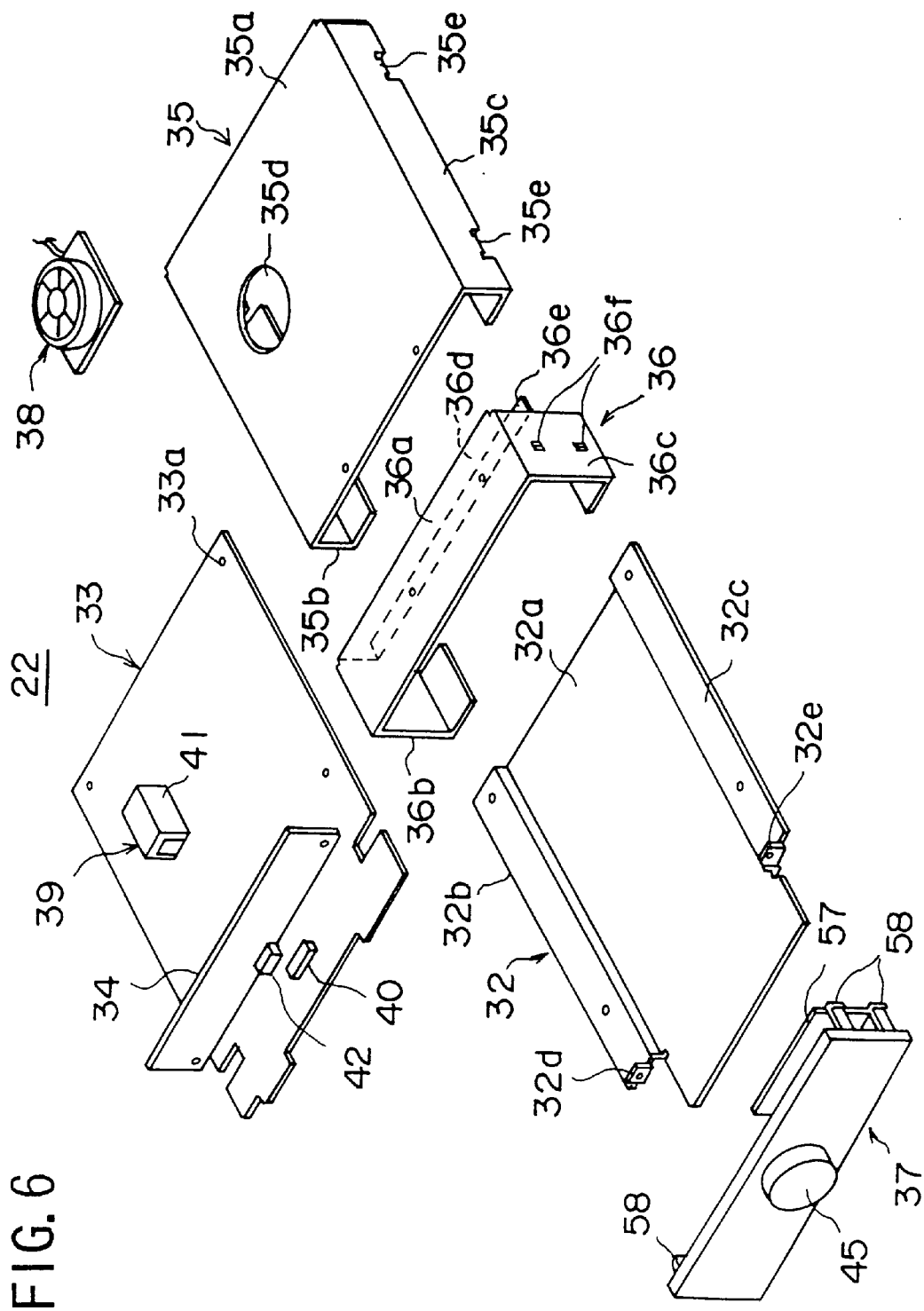
FIG. 6 is a diagram showing an exploded view of the amplifier.
Figure 7:
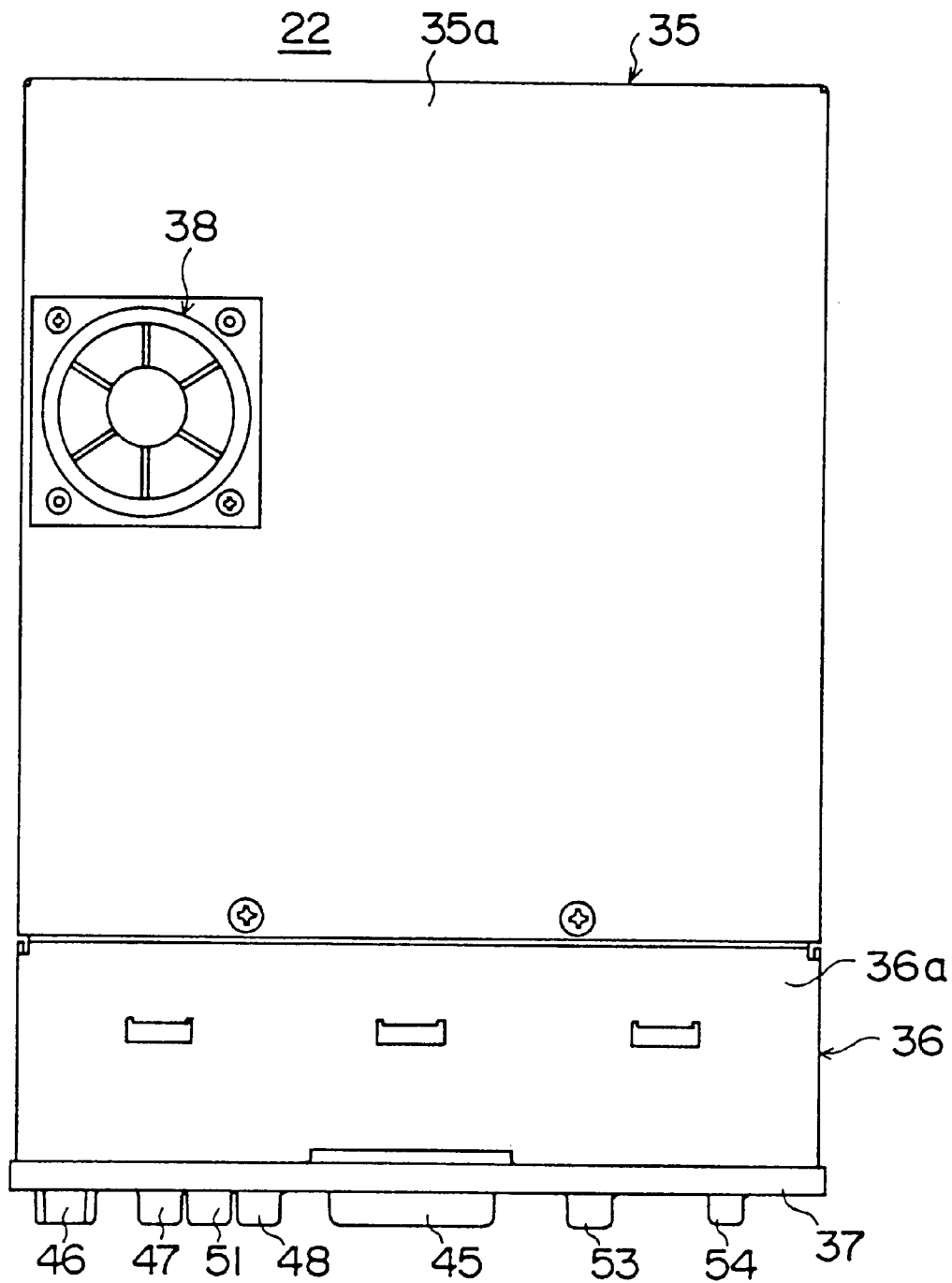
FIG. 7 is a diagram showing a plan view of the amplifier.
Figure 8:
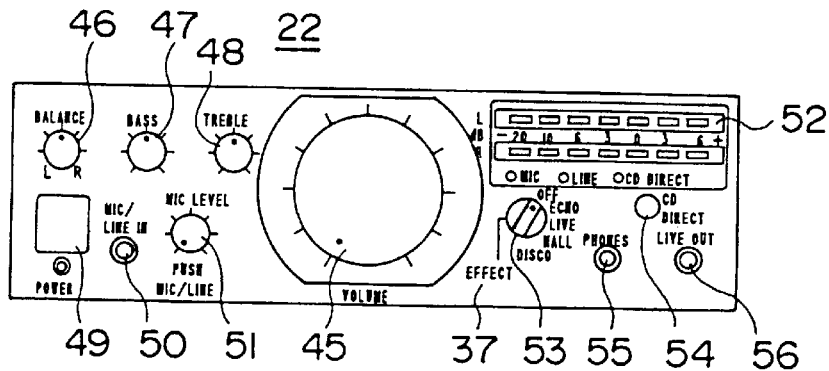
FIG. 8 is a diagram showing a front view of the amplifier.
Figure 9:
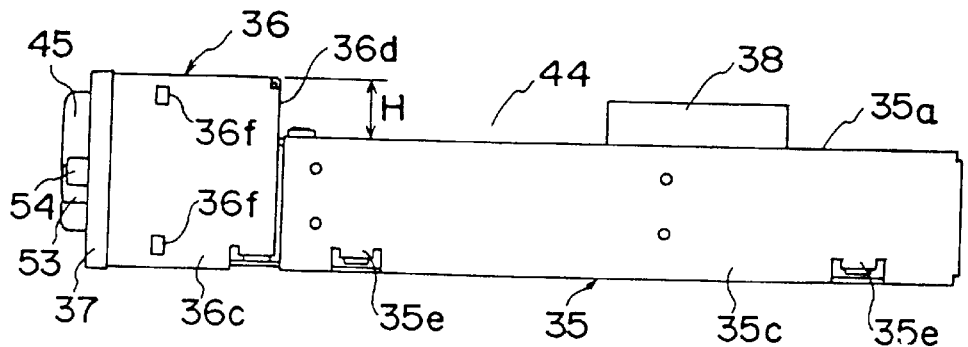
FIG. 9 is a diagram showing a side view of the amplifier.
Figure 10:
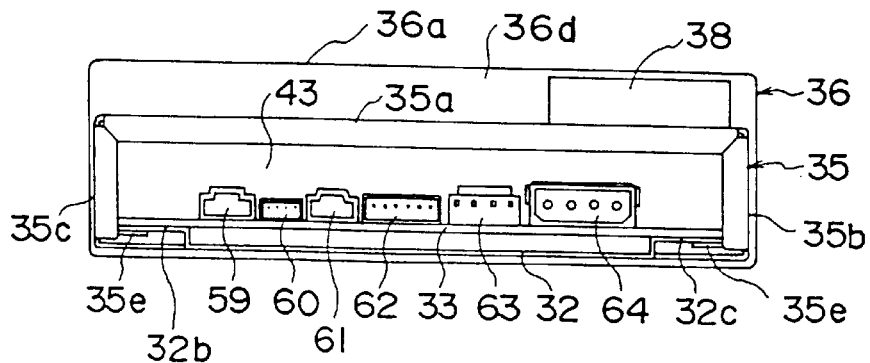
FIG. 10 is a diagram showing a rear view of the amplifier.

FIG. 5 is a diagram showing a perspective view of the amplifier 22. FIG. 6 is a diagram showing an exploded view of the amplifier 22. FIG. 7 is a diagram showing a plan view of the amplifier 22. FIG. 8 is a diagram showing a front view of the amplifier 22. FIG. 9 is a diagram showing a side view of the amplifier 22 and FIG. 10 is a diagram showing a rear view of the amplifier 22.

As shown in the figures, the amplifier 22 comprises a metal chassis 32, a first printing board 33 which is fixed on the chassis 32, a second printing board 34 which is fixed on the printing board 33 in a vertically extending position, a first cover 35 for covering the first printing board 33, a second cover 36 for covering the second printing board 34, a front bezel 37 which is fixed to a front surface of the second cover 36 and a cooling fan 38 which is fixed to an upper surface 35a of the first cover 35.

The chassis 32 includes first fixing portions 32b and 32c for fixing the first printing board 33 on a bottom surface 32a thereof by screws, and second fixing portions 32d and 32e for fixing the second printing board 34 by screws. Also, small holes 33a, the positions of which correspond to the first fixing portions 32b and 32c, are provided with the first printing board 33 so that the first printing board 33 may be fixed to the chassis 32 by the screws. Moreover, a power IC 39 which functions to amplify audio signals is provided in the vicinity of the center of the first printing board 33 and a connector 40 is provided at the front of the first printing board 33.

Since the amount of heat generated by the power IC 39 is large, it is covered by a heat-sink 41 which has a heat dissipating function. Also, as mentioned above, since the air flow generated by the air-intake fan 19 and the evacuation fan 25 is not enough to lower the temperature of the power IC 39, the power IC 39 is directly cooled by an air flow generated by the cooling fan 38 (to be described later).

The second printing board 34 includes small holes 34a to be fixed with the fixing portions 32d and 32e by a respective screw and a connector 42 which is connected to the connector 40 on the first printing board 33.

The first cover 35 is comprised of an upper surface 35a, side surfaces 35b and 35c, each of which is bent in an L-shape and provided so as to be opposed to each other as shown in FIG. 6. An airhole 35d is provided on the upper surface 35a at a position corresponding to the fixing position of the power IC 39. Also, a hooking portion 35e which is engaged with the fixing portions 32b and 32c, respectively, of the chassis 32, is provided with the side surfaces 35b and 35c.

The cooling fan 38 is provided over the airhole 35d. Accordingly, the air taken inside by the cooling fan 38 is directly blown to the heat-sink 41 on the power IC 39 to decrease the temperature thereof. Note that the front of the first cover 35 is closed by the second printing board 34 whereas a posterior opening 43 is provided at the back thereof.

That is, the air flow generated by the cooling fan 38 is first blown to the power IC 39 from the airhole 35d through the first cover 35 and then ejected from the posterior opening 43 via the space formed by the first cover 35 and the first printing board 33. Thus, the heat generated by the amplifier 22 is efficiently removed by the air flow (indicated by arrows in FIG. 4) caused by the cooling fan 38 and hence the temperature of the amplifier 22 may be continuously maintained within the range in which the amplifier 22 can be normally operated. For instance, the power IC 39 may be operated at 70° C., however, the temperature of the amplifier 22 may be lowered to 5° C. to 40° C. by operation of the cooling fan 38.

The posterior opening 43 functions as an exhaust outlet as well as an opening for a connection code of the cooling fan 38 which is connected to the first printing board 33 and an opening which provides easy cable connection by exposing corresponding connector provided with the first printing board 33.

Similar to the first cover 35, the second cover 36 is comprised of an upper surface 36a, side surfaces 36b and 36c, each of which is bent in a L-shape and provided so as to be opposed to each other as shown in FIG. 6. The height of the upper surface 36a of the second cover 36 is higher than that of the upper surface 35a of the first cover 35 by a distance H (refer to FIGS. 4 and 9).

Due to the difference in height of the upper surface 36a of the second cover 36 and the upper surface 35a of the first cover 35, a step portion 44 which provides a space for placing the cooling fan 38 is formed as shown in FIG. 9. The step portion 44 functions so as to provide a pathway for the air flow (indicated by arrows in FIG. 4) when the amplifier 22 is positioned close or next to the CD-ROM drive device 21. The air taken inside by the cooling fan 38 passes through the space formed by the step portion 44 and is supplied to the inside of the amplifier 22. For this reason, it is possible to cool down not only the inside of the amplifier 22 but also a lower part of the CD-ROM drive device 21 (where a board having heat-generating parts is provided) even when the amplifier 22 and the CD-ROM drive device 21 are placed close to each other. Thus, the temperature of the CD-ROM drive device 21 may be reduced.

Also, a fixing portion 36e which is fixed to the upper surface 35a of the first cover 35 is provided with a back surface 36d of the second cover 36. The back surface 36d is bent towards the back of the second cover 36 as shown in FIG. 6. Thus, the side surfaces 36b and 36c of the second cover 36 are fixed to the respective side of the chassis 32 and the fixing portion 36e of the second cover 36 is fixed to the upper surface 35a of the first cover 35 so as to be integrally fixed to the first cover 35.

As shown in FIG. 8, a volume knob 45, a balance knob 46, a low-sound knob 47, a high-sound knob 48, a power switch 49, a microphone jack 50, a microphone level knob 51, a right-and-left output level indicator 52, a mode selecting switch 53, a CD-DIRECT switch 54, a headphone jack 55, an output jack 56, etc., are provided with the front surface of the front bezel 37.

Also, a third printing board 57, on which various electrical parts are mounted, is fixed to the back of the front bezel 37. A hook 58, which is engaged with a hooking hole 36f provided with the side surfaces 36b and 36c, respectively, of the second cover 36, is provided at both sides of the back of the front bezel 37.

As shown in FIG. 10, CD-ROM input connectors 59 and 60, a sound card output connector 61, a connector card input connector 62, a connector card output connector 63, and a power source connector 64 are provided with the first printing board 33 which is located at the posterior opening 43 of the amplifier 22. Since the area of the posterior opening 43 of the amplifier 22 is sufficiently large, the air flow from the cooling fan 38 may be introduced inside the amplifier 22 through the posterior opening 43 and ejected through the posterior opening 43.

Although the cooling fan 38 is placed on the step portion 44 (i.e., the upper surface 35a of the first cover 35) of the amplifier 22 in the above embodiment, the location of the cooling fan 38 is not limited as such and can be placed anywhere as long as the air flow from the cooling fan 38 flows through the space formed by the step portion 44. Thus, for example, the cooling fan 38 may be placed in the amplifier 22 or may be located at the side of the housing so that air can be delivered to the space 44 in the side direction.

Figure 11:
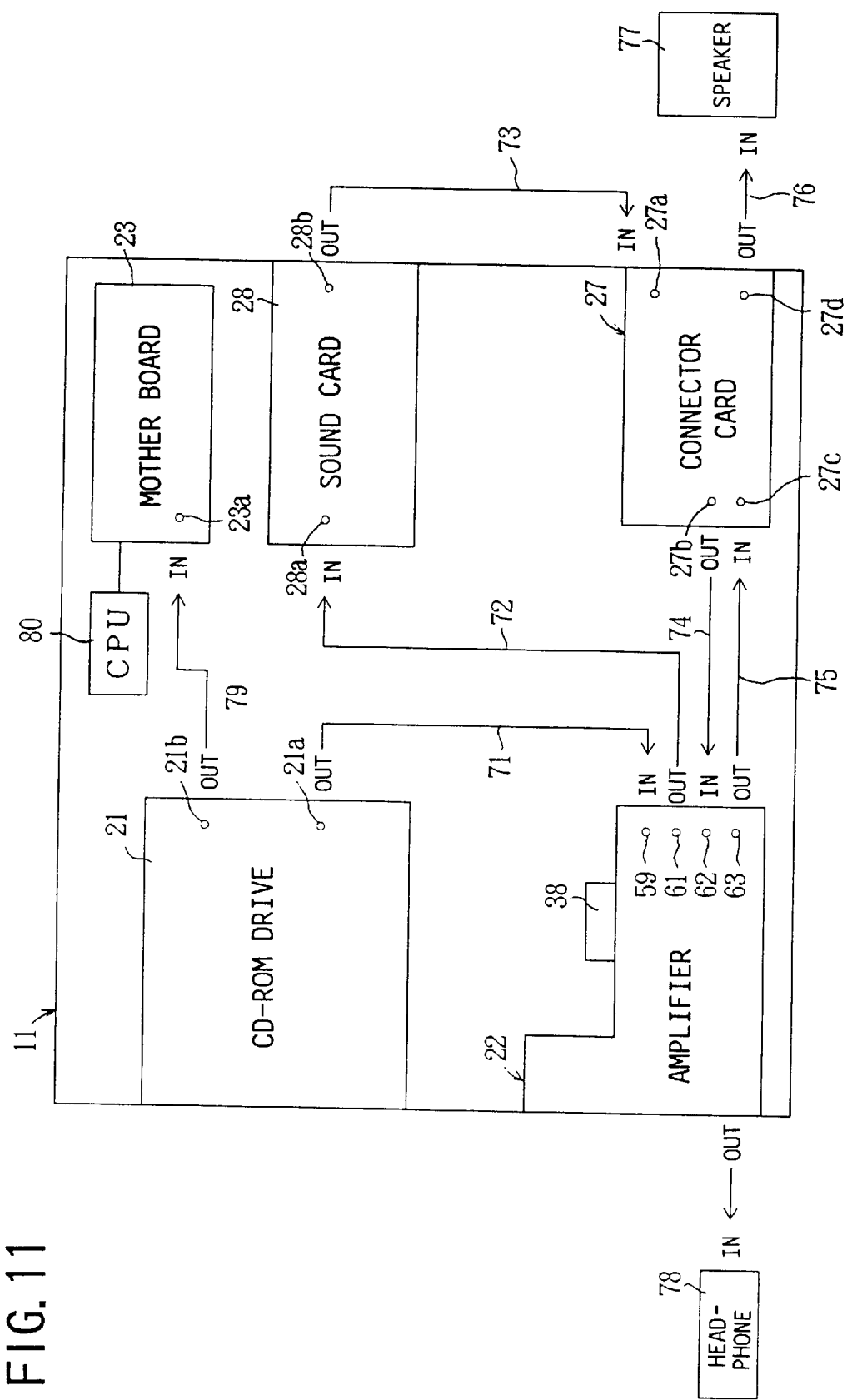
FIG. 11 is a block diagram showing a schematic structure of the main body of the personal computer.

FIG. 11 is a block diagram showing a schematic structure of the main body 11 of the personal computer according to the present invention.

The CD-ROM drive device 21 is placed in the second slot 14 provided to face the front of the main body 11 and the amplifier 22 is placed in the third slot 15. On the other hand, the connector card 27 is placed in the second slot 26₂ located at the back of the main body 11 and the sound card 28 is placed in the third slot 26₃.

An output audio terminal 21a of the CD-ROM drive device 21 is connected to the CD-ROM input connector 59 of the amplifier 22 via a first connection cable 71. The sound card output connector 61 of the amplifier 22 is connected to an input terminal 28a of the sound card 28 via a second connection cable 72.

An output terminal 28b of the sound card 28 is connected to an input terminal 27a of the connector card 27 via a third connection cable 73. An output terminal 27b of the connector card 27 is connected to the connector card input connector 62 via a fourth connection cable 74.

Also, the connector card output connector 63 of the amplifier 22 is connected to an input terminal 27c of the connector card 27 via a fifth connection cable 75. An output terminal 27d of the connector card 27 is connected to a speaker 77 via a sixth connection cable 76.

Figure 12:
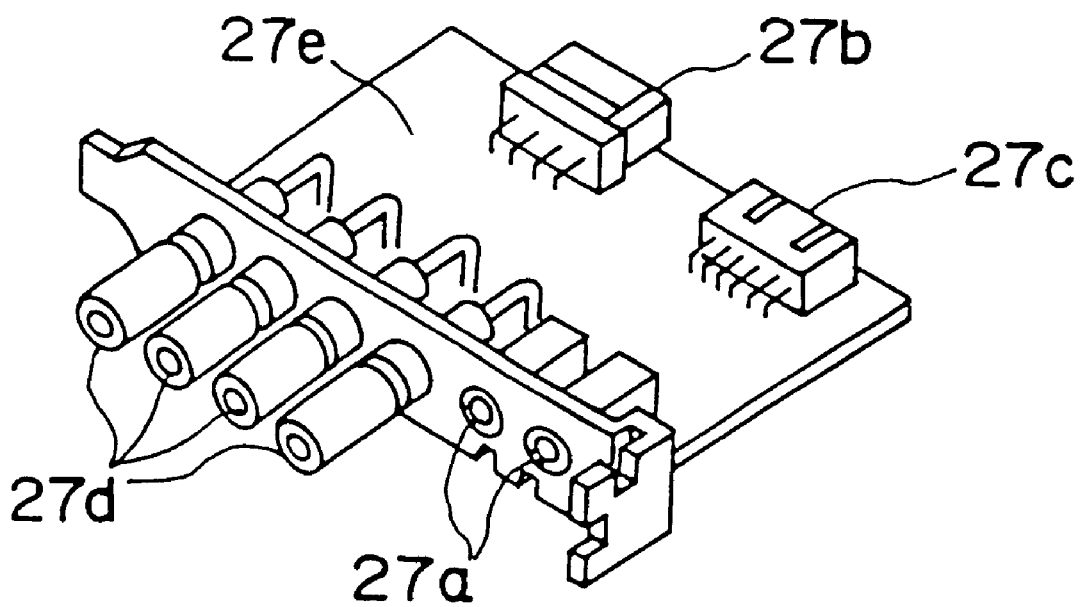
FIG. 12 is a diagram showing a perspective view of a connector card.

For instance, the input terminals 27a and 27c and the output terminals 27b and 27d, to which each of the respective cables 73 to 76 is connected, may be provided on a board 27e as shown in FIG. 12.

Also, a digital data signal output terminal 21b of the CD-ROM drive device 21 is connected to an input terminal 23a of the motherboard 23 via a seventh connection cable 79. The sound card 28 is a sound source which generates a sound, in accordance with an order from a CPU 80, corresponding to digital data (such as WAVE and MIDI) supplied to the motherboard 23 from the CD-ROM drive device 21 via the seventh connection cable 79. That is, the digital data signal reproduced by the CD-ROM drive device 21 is output to the speaker 77 via the seventh cable 79, the motherboard 23, the sound card 28, the connector card 27, the amplifier 22, and the connector card 27.

The CD-DIRECT switch 54 positioned on the front bezel 37 of the amplifier 22 is used to select a transmission pathway for the audio signals reproduced by the CD-ROM drive device 21. According to this embodiment of the present invention, when the CD-DIRECT switch is turned off, the audio signals input to the input terminal 59 are directly output to the sound card 28 via the output terminal 61 and the audio signals input to the input terminal 62 are amplified.

However, when the CD-DIRECT switch 54 is turned on, the audio signals input to the input terminal 59 are amplified by the amplifier 22 and then output to the connector card 27 via the output terminal 63. In this state, signals input to the input terminal 62 via the connector card 27 are ignored.

As mentioned above, since the CD-ROM drive device 21, the amplifier 22, the connector card 27, the sound card 28, and the speaker 77 are connected via each of the cables 71 to 76, the audio signals reproduced by the CD-ROM drive device 21 are output to the speaker 77 via the first cable 71, the amplifier 22, the sound card 28, the connector card 27, the amplifier 22, and the connector card 27 when the CD-DIRECT switch is turned off.

In the above case, the audio signals reproduced by the CD-ROM drive device 21 and the audio signals generated by the digital data signals from the motherboard 23 are input to the input terminal 62 of the amplifier 22 via the sound card 28. The two audio signals are amplified by the amplifier 22 and output to the speaker 77 via the connector card 27.

Although the audio signals reproduced by the CD-ROM drive device 21 pass through the amplifier 22 twice in the above transmission pathway, the audio signals input to the input terminal 59 at the first run are not amplified by the amplifier 22 and only the audio signals input to the input terminal 62 at the second run are amplified.

When the audio signals pass through the sound card 28 as in the above case, it is possible to adjust the volume of the sound using software or to reproduce the sound of WAVE or MIDI. However, since the audio signals pass through the sound card 28, a deterioration in the sound quality cannot be avoided.

As mentioned above, the quality of the sound from the audio signals which passed through the sound card 28 is lowered. However, since the transmission pathway of the audio signals may be switched by turning on the CD-DIRECT switch 54 of the amplifier 22, it is possible to prevent the deterioration of the sound quality due to the sound card 28. That is, when the CD-DIRECT switch 54 is turned on, the audio signals reproduced by the CD-ROM drive device 21 are output to the speaker 77 via the first connection cable 71, the amplifier 22, and the connector card 27.

In the above mentioned case, a sound of excellent quality may be reproduced from the speaker 77 since the audio signals are not passed through the sound card 28 and deterioration of the sound quality is avoided. Also, although adjustment of sound volume is not controlled by using software since the audio signals are not passed through the sound card 28, the volume of the sound may be adjusted using the volume knob 45 located on the front bezel 37 of the amplifier 22.

Moreover, when a user listens to the reproduced sound from the CD-ROM drive device 21 using a headphone 78, reproduced signals are output to the headphone 78 via the headphone jack 55 of the amplifier 22.

As mentioned above, since the main body 22 includes the amplifier 22, it is not necessary to use, for instance, a speaker containing a small amplifier, and it becomes possible to employ a high quality speaker generally used in a stereo. Thus, the quality of sound may be more improved according to the present invention.

Although a case in which the CD-ROM drive device 21 and the amplifier 22 are used as internal devices is explained in the above embodiment, the present invention is not limited as such, and may be applied to a structure in which other devices (for instance, a magnetic tape device such as DAT, a mini-disk (MD) device, and an equalizer) are provided in the slots of the front side.

Also, the main body 11 of a personal computer is used as an electronic device in the above embodiment, it is possible to use other electronic devices which tend to be effected by temperature (such as a game machine).

In addition, it is obvious that the present invention is not limited to the above-mentioned embodiments, and variations and modifications may be made without departing from the scope of the invention.

What is claimed is:

1. An internal device provided with electronic parts inside said internal device and contained in an electronic device, comprising:

a housing, a part of said housing having a step portion; and a fan provided in a vicinity of said step portion and cooling said electronic parts, wherein a space is provided as a pathway for an air flow generated by said fan, a part of said space having a boundary defined by said step portion of said housing when said internal device is positioned in said electronic device, and wherein a part of said space has a boundary defined, by a surface of another internal device placed on the top of said internal device.

2. The internal device as claimed in claim 1, wherein said housing is substantially a rectangular solid having said step portion.

3. The internal device as claimed in claim 1, wherein a slot provided with said electronic device and in which said internal device is placed has a substantially rectangular shape corresponding to the shape of said internal device.

4. The internal device as claimed in claim 1, wherein said fan is positioned on a surface of said housing which defines said step portion.

5. An electronic device including at least one internal device provided with electronic parts inside said internal device, said internal device comprising:

a housing, a part of said housing having a step portion; and wherein a space is provided as a pathway for an air flow generated by said fan, a part of said space having a boundary defined by said step portion of said housing when said internal device is positioned in said electronic device, and wherein a part of said space has a boundary defined, by a surface of another internal device placed on the top of said internal device.

6. An electronic device including at least a first slot and a second slot located next to said first slot, wherein a first internal device comprises:

a housing, a part of said housing having a step portion; and a fan provided in a vicinity of said step portion and cooling electronic parts arranged inside said first internal device, said first internal device located in said first slot, and a second internal device located in said second slot, wherein a space is provided between said first internal device and said second internal device as a pathway for an air flow generated by said fan, a part of said space having a boundary defined by said step portion of said housing of said first internal device and a surface of said second internal device facing said first internal device, and wherein a part of said space has a boundary defined, by a surface of another internal device placed on the top of said internal device.

7. An internal device, provided with electronic parts inside said internal device and contained in a substantially-rectangular-solid slot formed in an electronic device, comprising:

a housing having a shape in which a step portion is formed as a result of a part of a rectangular solid corresponding to said slot being cut out; and a fan provided in a vicinity of said step portion and cooling said electronic parts, wherein a space obtained as a result of said part of said housing being cut out is provided as a pathway for an air flow generated by said fan when said internal device is positioned in said electronic device.

8. The internal device as claimed in claim 7, wherein a part of said space has a boundary defined by a surface of another internal device placed next to said internal device.

9. The internal device as claimed in claim 7, wherein said fan is positioned on a surface of said housing which defines said step portion.

10. An internal device provided with electronic parts inside said internal device and contained in an electronic device, comprising:

a housing, a part of said housing having a step portion; and a fan provided in a vicinity of said step portion and cooling said electronic parts, wherein a space is provided as a pathway for an air flow generated by said fan, a apart of said space having a boundary defined by said step portion of said housing when said internal device is positioned in said electronic device, and wherein a part of said space has a boundary defined, by a surface of another internal device placed in the vicinity of said step portion of said internal device.

11. The internal device as claimed in claim 10, wherein said housing is substantially a rectangular solid having said step portion.

12. The internal device as claimed in claim 10, wherein a slot provided with said electronic device and in which said internal device is placed has a substantially rectangular shape corresponding to the shape of said internal device.

13. The internal device as claimed in claim 10, wherein said fan is positioned on a surface of said housing which defines said step portion.

14. An electronic device including at least two internal devices, one internal device of said two internal devices being provided with electronic parts inside said internal device, said internal device comprising:

a housing, a part of said housing having a step portion; and wherein a space is provided as a pathway for an air flow generated by a fan, a part of said space having a boundary defined by said step portion of said housing when said internal device is positioned in said electronic device, and wherein a part of said space has a boundary defined, by a surface of another internal device placed in the vicinity of said step portion of said internal device.

15. An electronic device including at least a first slot and a second slot located next to said first slot, wherein a first internal device comprises:

a housing, a part of said housing having a step portion; and a fan provided in a vicinity of said step portion and cooling electronic parts arranged inside said first internal device, said first internal device located in said first slot, and a second internal device located in said second slot, wherein a space is provided between said first internal device and said second internal device as a pathway for an air flow generated by said fan, a part of said space having a boundary defined by said step portion of said housing of said first internal device and a surface of said second internal device facing said first internal device, and wherein a part of said space has a boundary defined, by a surface of another internal device placed in the vicinity of said step portion of said internal device.

* * * * *